United States Patent
Mücke

(10) Patent No.: US 9,817,741 B2
(45) Date of Patent: Nov. 14, 2017

(54) METHOD FOR MONITORING AN APPARATUS CONNECTED TO A COMMUNICATION CHANNEL

(71) Applicant: VOLKSWAGEN AG, Wolfsburg (DE)

(72) Inventor: Maurice Mücke, Wolfsburg (DE)

(73) Assignee: VOLKSWAGEN AG (DE)

(*) Notice: Subject to any disclaimer, the term of this patent is extended or adjusted under 35 U.S.C. 154(b) by 0 days.

(21) Appl. No.: 14/424,784

(22) PCT Filed: Aug. 28, 2013

(86) PCT No.: PCT/EP2013/067822
§ 371 (c)(1),
(2) Date: Feb. 27, 2015

(87) PCT Pub. No.: WO2014/033171
PCT Pub. Date: Mar. 6, 2014

(65) Prior Publication Data
US 2015/0220414 A1    Aug. 6, 2015

(30) Foreign Application Priority Data

Sep. 1, 2012 (DE) .................... 10 2012 017 386

(51) Int. Cl.
*G06F 11/30* (2006.01)
*H04L 12/26* (2006.01)
(Continued)

(52) U.S. Cl.
CPC ...... *G06F 11/3065* (2013.01); *G06F 11/0739* (2013.01); *G06F 11/0757* (2013.01);
(Continued)

(58) Field of Classification Search
None
See application file for complete search history.

(56) References Cited

U.S. PATENT DOCUMENTS 6,367,022 B1    4/2002  Gillespie et al.
6,604,038 B1    8/2003  Lesesky et al.
(Continued)

FOREIGN PATENT DOCUMENTS

CN    101052555 A    10/2007
CN    101123487 A    2/2008
(Continued)

OTHER PUBLICATIONS

Search Report for German Patent Application No. 10 2012 017 386.5; dated Apr. 25, 2013.
(Continued)

*Primary Examiner* — Ilwoo Park
(74) *Attorney, Agent, or Firm* — Barnes & Thornburg LLP

(57) ABSTRACT

Method for monitoring an apparatus connected to a communication channel wherein the method is connected to a communication channel in a vehicle. When an interval of time between two messages that are output by the apparatus is shorter than or the same as a determined period, the method determines is the apparatus is in a correct state. The apparatus can output a monitoring sign-out message to the communication channel. When a message recently output by the apparatus includes the monitoring sign-out message, it is determined that the apparatus is in a correct state.

15 Claims, 2 Drawing Sheets

(51) Int. Cl.
*H04L 12/40* (2006.01)
*G06F 11/07* (2006.01)

(52) U.S. Cl.
CPC ........ *H04L 12/40006* (2013.01); *H04L 43/10* (2013.01); *H04L 43/0817* (2013.01); *H04L 2012/40215* (2013.01); *H04L 2012/40273* (2013.01)

(56) References Cited

U.S. PATENT DOCUMENTS

| | | | |
|---|---|---|---|
| 7,764,185 B1 | 7/2010 | Manz et al. | |
| 2005/0198545 A1 | 9/2005 | Wieck et al. | |
| 2006/0115693 A1* | 6/2006 | Toth | G01R 31/3631 429/413 |
| 2009/0132070 A1 | 5/2009 | Ebrom et al. | |
| 2011/0083029 A1 | 4/2011 | Tupa et al. | |
| 2013/0139018 A1* | 5/2013 | Takada | H04L 12/407 714/748 |
| 2013/0201817 A1* | 8/2013 | Jiang | H04L 41/0659 370/217 |

FOREIGN PATENT DOCUMENTS

| | | |
|---|---|---|
| CN | 101417636 A | 4/2009 |
| CN | 102638563 A | 8/2012 |
| DE | 102005015912 A1 | 11/2005 |
| DE | 102006040442 A1 | 3/2008 |
| DE | 602005005108 T2 | 3/2009 |
| DE | 102007061724 A1 | 6/2009 |
| DE | 102010008818 A1 | 8/2011 |
| DE | 102010043659 A1 | 5/2012 |
| DE | 102011089590 A1 | 8/2012 |
| EP | 1634258 A1 | 3/2006 |
| EP | 2487867 A1 | 8/2012 |
| JP | 03139094 A | 6/1991 |
| JP | 2003137045 A | 5/2003 |
| JP | 2012-39446 A * | 2/2012 |
| JP | 2012074849 A | 4/2012 |
| WO | WO 2012/020761 A1 * | 2/2012 |

OTHER PUBLICATIONS

Search Report and Written Opinion for International Patent Application No. PCT/EP2013/067822; dated Oct. 29, 2013.
Office Action for Chinese Patent Application No. 201380045777.3; dated Mar. 3, 2017.
Office Action for Chinese Patent Application No. 201380045777.3; Mar. 3, 2017.

* cited by examiner

METHOD FOR MONITORING AN APPARATUS CONNECTED TO A COMMUNICATION CHANNEL

PRIORITY CLAIM

This patent application is a U.S. National Phase of International Patent Application No. PCT/EP2013/067822, filed 28 Aug. 2013, which claims priority to German Patent Application No. 10 2012 017 386.5, filed 1 Sep. 2012, the disclosures of which are incorporated herein by reference in their entirety.

SUMMARY

Illustrative embodiments relate to a method for monitoring an apparatus connected to a communication channel in a vehicle. Illustrative embodiments also relate to an apparatus for a vehicle which is coupled to a communication channel of the vehicle and has its operational status monitored. Illustrative embodiments also relate to a monitoring apparatus for monitoring an apparatus connected to a communication channel in a vehicle.

A multiplicity of electronic apparatuses, what are known as controllers, are used in a vehicle, such as an automobile or a truck. By way of example, the apparatuses can be used to control motor functions, vehicle functions, such as electronic chassis control or brake control, and also comfort functions, such as electronic seat adjustment or mirror adjustment. These electronic apparatuses can exchange information via one or more data buses of the vehicle, for example via what is known as the CAN bus. Some of these electronic apparatuses or controllers participate in the data communication in the vehicle only intermittently. When the controller is not being used, they can stop the data traffic, for example. From the point of view of a monitoring appliance that monitors proper operation of the electronic apparatuses or controllers, such a state in which the controller to be monitored is not transmitting data cannot be distinguished from failure of the controller. For this reason, such controllers are usually monitored only to a restricted degree.

Illustrative embodiments provide improved monitoring for apparatuses connected to a communication channel. In particular, the monitoring should also reliably monitor apparatuses and controllers that participate in the data communication via the communication channel only intermittently.

BRIEF DESCRIPTION OF THE DRAWINGS

The present invention will be described in detail below with reference to the appended drawings.

DETAILED DESCRIPTION OF THE DISCLOSED EMBODIMENTS

Figure 1:
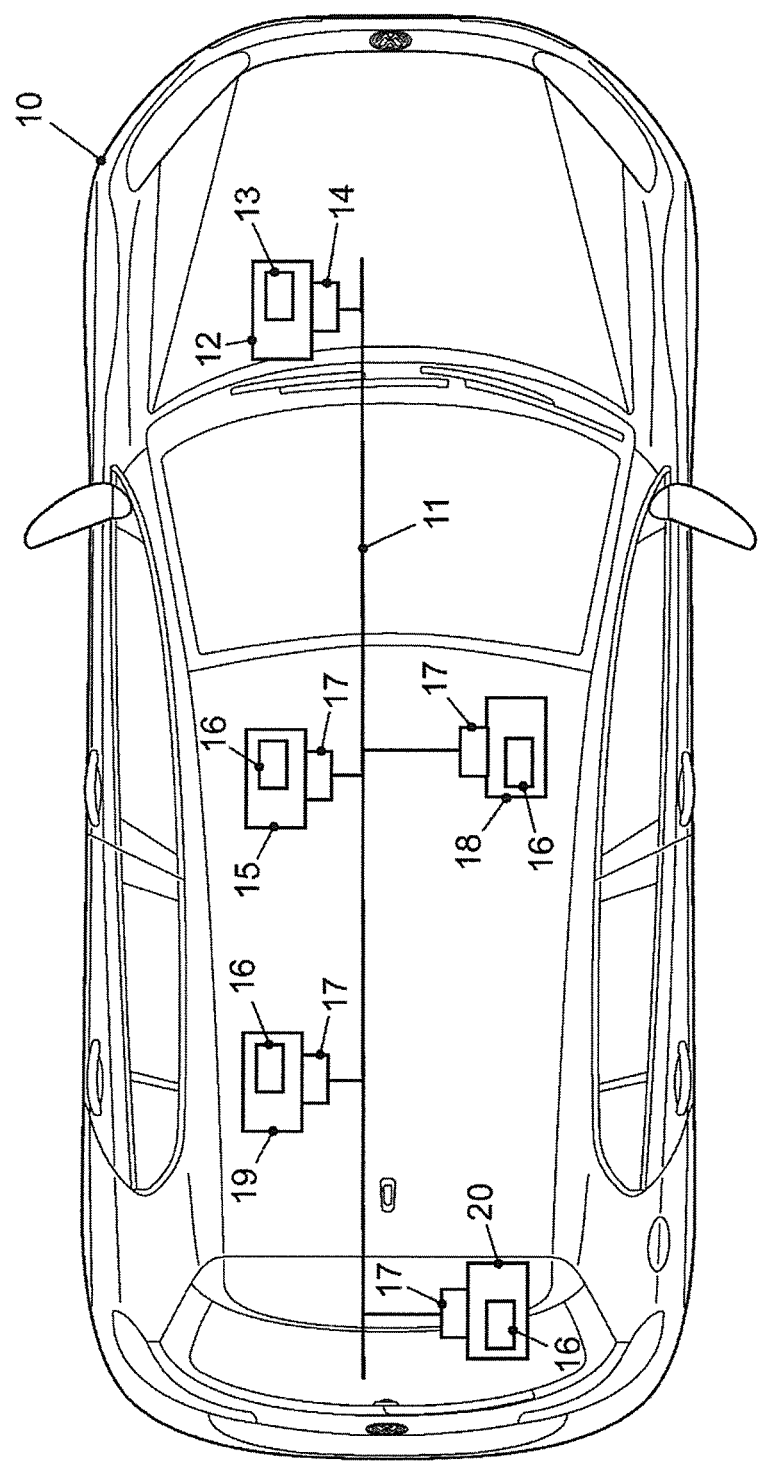
FIG. 1 schematically shows a vehicle according to at least one disclosed embodiment.

A method for monitoring an apparatus connected to a communication channel in a vehicle is provided. When an interval of time between two messages output by the apparatus onto the communication channel is shorter than or the same as a particular period, the method involves determining that the apparatus is in a proper state. In addition, the apparatus outputs a monitoring logoff message onto the communication channel, particularly when the apparatus has determined, for example on the basis of internal states, that it will probably output no further messages onto the communication channel for a relatively long time in future. When a message most recently output by the apparatus comprises the monitoring logoff message, it is determined that the apparatus is in a proper state, even if more time than the particular period has elapsed since the output of this message most recently output by the apparatus. The message most recently output by the apparatus denotes the message that has been output onto the communication channel immediately before the determination of whether the apparatus is in a proper state. In other words, the apparatus is monitored such that the apparatus is classified as OK while it outputs messages for which the interval of time is shorter than or the same as the particular period. When the apparatus has determined that it will probably output no messages for a longer time than the particular period, it outputs the monitoring logoff message. By way of example, this monitoring logoff message can be a predetermined message or comprise a particular annotation in a data message. After the apparatus has output the monitoring logoff message, the interval of time between two messages output by the apparatus is no longer used as a criterion for confirming the proper state of the apparatus. The apparatus is therefore also classified as OK when the message most recently output by the apparatus comprises the monitoring logoff message and more time than the particular period has elapsed since the output of this monitoring logoff message. Hence, the apparatus can log off from a monitoring apparatus in good time, as a result of which it is possible to ensure continuous monitoring. Communication errors or failures by the apparatus can be reliably identified in the non-logged-off state of the apparatus. Since the apparatus is automatically removed from the monitoring when it has sent the monitoring logoff message, systematic monitoring of the apparatus is possible in the first place.

According to at least one disclosed embodiment, the method involves the apparatus that has output the monitoring logoff message being excluded from the monitoring until the apparatus outputs a further message onto the communication channel. By way of example, the further message can comprise a standard data message. This automatically reincludes the apparatus in the monitoring as soon as it participates in the communication along the communication channel again. Specific logging onto the communication channel is not necessary, which means that additional communication messages can be avoided.

According to a further disclosed embodiment, it is determined that the apparatus is in an improper state when the message most recently output by the apparatus does not comprise the monitoring logoff message and additionally more time than the particular period has elapsed since the output of the message most recently output by the apparatus. This allows failure of the apparatus to be sensed quickly and reliably. By way of example, the particular period can have a valve in the range from 20 ms to 2 s. This allows rapid sensing of failure of the apparatus. In the proper state and without logging off from the monitoring, for example, the apparatus can transmit messages at an interval that is 5-10 times shorter than the predetermined period, for example. This can improve the robustness of the monitoring and may be necessary, particularly in the case of non-deterministic bus systems, such as a CAN bus.

The communication channel can comprise a vehicle data bus, particularly what is known as a CAN (controller area network) bus. The method described above can be used to reliably monitor apparatuses that are connected to one another via the vehicle data bus for their proper state without the apparatuses producing an unnecessarily high communication load on the vehicle data bus, for example, to output messages within the predetermined period, even though no communication is actually required.

An apparatus for a vehicle is additionally provided that comprises an interface for connecting the apparatus to a communication channel of the vehicle and a processing unit. The processing unit is designed to output a monitoring logoff message on the communication channel via the interface to indicate that the apparatus is subsequently intended to be excluded from monitoring until the apparatus outputs a further message onto the communication channel. This allows the apparatus to be monitored for its proper operation by an appropriate monitoring apparatus while it is participating in the communication on the communication channel. When the apparatus stops its communication via the communication channel at least intermittently, it signals this by means of the monitoring logoff message, so that the monitoring apparatus does not incorrectly indicate an error in the apparatus on account of absence of messages from the apparatus. This can reduce a volume of communication on the communication channel and furthermore save power in the apparatus, for example by transferring the apparatus to what is known as a sleep mode while it is not needed. This can furthermore improve the durability of the apparatus.

By way of example, the apparatus can comprise a comfort controller of the vehicle, such as a seat adjuster, a mirror adjuster or a controller for a vehicle entertainment system, such as a radio. Furthermore, the apparatus can comprise a controller for a trailer hitch or a charger for an electric vehicle. In particular, the aforementioned comfort controllers or the controllers for trailer hitch and charger can stop their communication and/or be transferred to the sleep mode for a relatively long time after they have output a monitoring logoff message onto the communication channel.

A monitoring apparatus for monitoring an apparatus connected to a communication channel in a vehicle is additionally provided. The monitoring apparatus comprises an interface for connecting the monitoring apparatus to the communication channel and a processing unit. When an interval of time between two messages output by the apparatus is shorter than or the same as a particular period, the processing unit determines that the apparatus is in a proper state. In addition, the processing unit determines that the apparatus is in a proper state when a message most recently output by the apparatus comprises a monitoring logoff message, even if more time than the particular period has elapsed since the output of this message most recently output by the apparatus. In other words, the apparatus is identified as proper while it transmits messages at the interval shorter than or the same as a particular period or after it has transmitted the monitoring logoff message. After the monitoring logoff message has been transmitted, it is no longer relevant whether further messages are output at the interval shorter than or the same as the particular period. The monitoring apparatus may be designed to carry out the method described above and therefore also comprises the advantages described above in connection with the method.

Finally, disclosed embodiments provide a vehicle that comprises a communication channel, at least one apparatus to be monitored, as has been described above, and a monitoring apparatus, as has been described above. The communication channel is used to connect the at least one apparatus to be monitored and the monitoring apparatus. Reliable monitoring of the apparatuses to be monitored is possible in the vehicle even when the apparatuses to be monitored participate in the data communication in the vehicle only intermittently.

FIG. 1 shows a vehicle 10 having a communication channel 11, for example a vehicle communication bus, for example a CAN bus. The communication channel 11 connects apparatuses, what are known as or controllers, 15 and 18-20 that are arranged in the vehicle 10 for the purpose of controlling different functions. By way of example, the controllers 15 and 18 may comprise a controller for a seat adjustment for a driver's or passenger seat. In addition, the controller 20 may comprise a controller for a trailer hitch (not shown) of the vehicle 10, for example. The vehicle 10 additionally comprises a monitoring apparatus 12 that is designed to monitor the controllers 15 and 18-20. Each of the controllers 15 and 18-20 comprises a respective interface 17 for coupling the controller to the communication channel 11. In addition, each controller 15 and 18-20 comprises a respective processing unit 16, for example a microcontroller. The monitoring apparatus 12 comprises an interface 14 for coupling to the communication channel 11 and also a processing unit 13.

Figure 2:
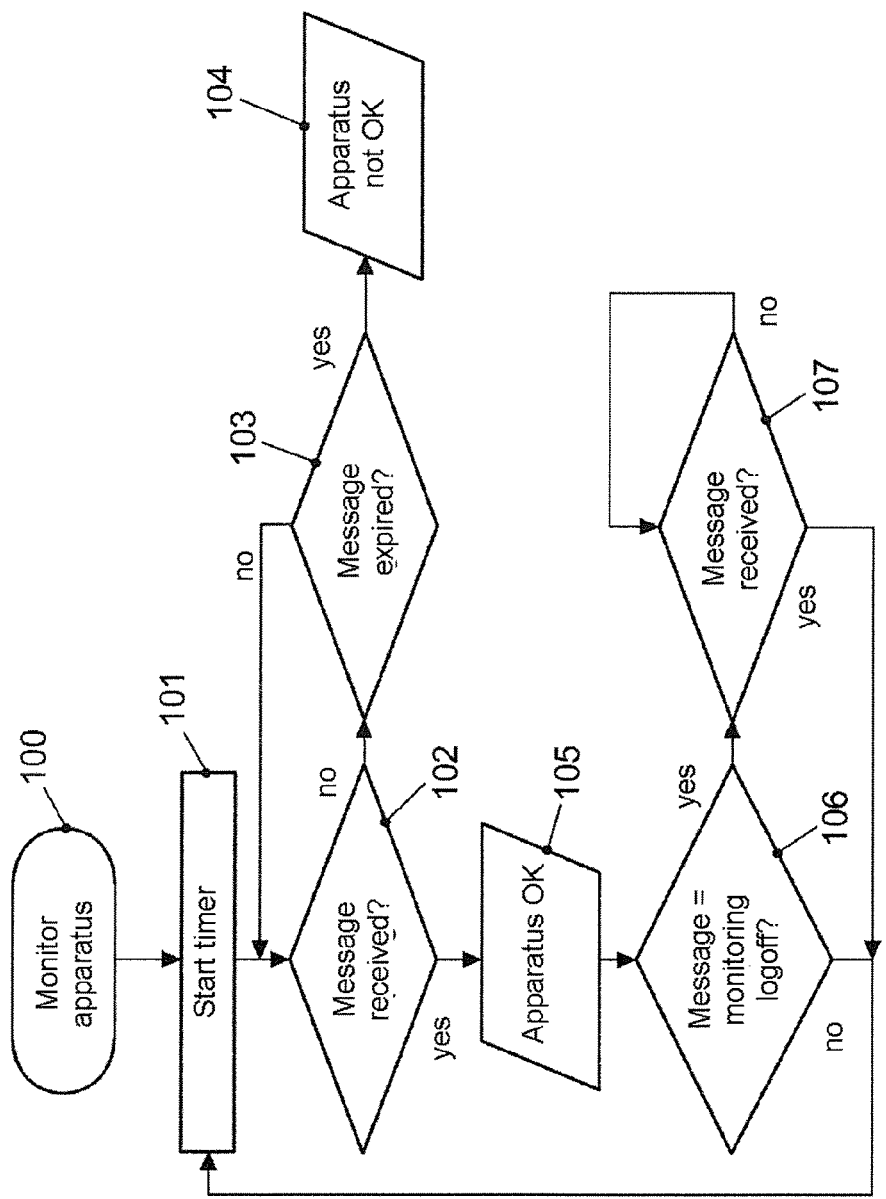
FIG. 2 shows a flowchart with steps of a method for monitoring an apparatus connected to a communication channel according to at least one disclosed embodiment.

To monitor the apparatuses 15 and 18-20, the monitoring apparatus 12 monitors messages that are output onto the communication channel 11 by the apparatuses 15 and 18-20. FIG. 2 shows an example of a flowchart for the monitoring of the apparatuses 15 and 18-20. For each of the apparatuses 15 and 18-20 to be monitored, the process shown in FIG. 2 can be realized in the processing unit 13 of the monitoring apparatus 12 by software, for example. In step 100, the monitoring of the apparatus 15, 18, 19 or 20 begins. In step 101, a timer is started. In step 102, a check is performed to determine whether a message has been output onto the communication channel 11 by the relevant apparatus and has been received by the monitoring apparatus 12. If no message has been received, the processing unit 13 uses the timer in step 103 to check whether a predetermined period has expired. By way of example, the period can have a value in the range from 200 ms to 2 s. While this predetermined period has not expired, the processing unit 13 continues to await reception of a message in step 102. When it has been established in step 103 that the predetermined period has expired, the processing unit 13 determines, in step 104, that the relevant apparatus is not OK, since no message has been received from the apparatus for a time longer than the predetermined period. As soon as a message has been received from the apparatus in step 102, the processing unit 13 determines in step 105 that the relevant apparatus is working properly, since it has output a message within the given period. In step 106, the processing unit 13 checks whether the message received from the apparatus is a monitoring logoff message. If it was not a monitoring logoff message, the method is continued in step 101 by restarting the timer. If the received message was a monitoring logoff message, the method is continued in step 107. In that step, the processing unit 13 waits until a further message is received from the apparatus. As soon as a message is received from the apparatus, the method is continued in step 101.

Since some controllers or apparatuses of a vehicle participate in the data communication in the vehicle only intermittently, it is usually not possible for a monitoring apparatus to distinguish this from a genuine failure. Usually, such controllers are therefore monitored only to a restricted degree. On the basis of the method described above, the controller logs off from the monitoring controller in good time by means of the monitoring logoff message, for example directly after or for example one second after the probably temporarily last message output. As a result, the monitoring can always be ensured up to this small window, and it becomes possible to monitor even controllers that participate in the data communication only intermittently. The monitoring controller 12 then stops its monitoring. In a genuine error situation for one of the apparatuses 15 and 18-20, the data traffic is absent without notification by means of the monitoring logoff, which means that this can be reliably identified by the monitoring apparatus 12. By way of example, typical error situations for the apparatuses 15 and 18-20 also include line interruptions, as a result of which the data communication channel or a power supply for the monitoring apparatus 15, 18-20 can fail.

It is possible for the method described above to be introduced in a manner compatible with previous bus systems by virtue of new controllers introducing the monitoring logoff message independently of the monitoring apparatus. Standard monitoring apparatuses are already designed such that unknown messages are assigned to monitoring of appliances that work only with the ignition switched on. If an apparatus outputs the monitoring logoff message, the monitoring apparatus therefore assumes an appliance that works and sends messages only with the ignition switched on.

A multiplicity of electronic apparatuses, what are known as controllers, are used in a vehicle, such as an automobile or a truck. By way of example, the apparatuses can be used to control motor functions, vehicle functions, such as electronic chassis control or brake control, and also comfort functions, such as electronic seat adjustment or mirror adjustment. These electronic apparatuses can exchange information via one or more data buses of the vehicle, for example via what is known as the CAN bus. Some of these electronic apparatuses or controllers participate in the data communication in the vehicle only intermittently. When the controller is not being used, they can stop the data traffic, for example. From the point of view of a monitoring appliance that monitors proper operation of the electronic apparatuses or controllers, such a state in which the controller to be monitored is not transmitting data cannot be distinguished from failure of the controller. For this reason, such controllers are usually monitored only to a restricted degree.

In this connection, EP 1 634 258 B1 discloses a method for protecting electronic arrangements against unauthorized removal. A first arrangement is automatically selected as the protection arrangement from the arrangements. This arrangement periodically transmits a protection signal, and a protection reaction is triggered by one of the other arrangements if the other arrangement receives no protection signal after a particular time. When the protection arrangement is disconnected, it first of all transmits a logoff signal that indicates to the arrangements to be protected that no further protection signals are being transmitted by the protection arrangement, and as a result a further arrangement is automatically chosen as the protection arrangement from the remainder of the arrangements.

DE 10 2006 040 442 B4 relates to bus communication management for a motor vehicle having a plurality of controllers connected via a bus. Activity by the controllers is dependent on communication that takes place between the controllers via the bus system. A first controller is designed not to permit communication on the bus system when the vehicle is in an idle state, and second controllers are designed to prevent communication on the bus system when the first controller does not permit the communication. In addition, there is a force shutdown special function that interrupts communication that already exists between a controller and other controllers and that takes place via the bus system.

U.S. Pat. No. 7,764,185 B1 relates to a network event warning system that allows distribution of event warning messages to one or more individual units within a network information system. A computer system comprises a power management means to allow power to be saved by virtue of the computer being transferred to a sleep mode when it is not being used.

US 2011/0083029 A1 relates to a controller, wherein a first controller can provide a piece of system state information and a second controller can receive the piece of system state information. The second controller may be programmed to control the state of a component. The component may have a disconnection input to receive a disconnection signal from the second controller.

DE 10 2007 061 724 A1 relates to a method for transmitting data from a sending subscriber in a communication system to a receiving subscriber in the communication system via a communication medium of the communication system. The data are transmitted via the communication medium in messages that each comprise a plurality of data blocks. The receiving subscriber identifies the end of the data blocks in the received messages and then takes the transmitted data from identified data blocks.

DE 60 2005 005 108 T2 relates to an apparatus control system in a vehicle that has a main control device and at least one actuator unit. The main control device is intended to carry out serial data transmission with at least one actuator unit by means of a bus that is supplied with power by a battery power source. The serial data transmission is carried out to actuate the at least one actuator unit by supplying an operating command from the main control device to the at least one actuator unit and to supply various information from the at least one actuator unit to the main control device. The main control device has a voltage monitor for monitoring a voltage of the battery power source. The main control device has a connection permission unit to permit transmission of connection data between the main control device and the at least one actuator device when the voltage of the battery power source is in a predetermined voltage range. The connection permission unit prohibits the transmission of the data connection if the battery power source is outside the predetermined voltage range.

DE 10 2005 015 912 A1 relates to a method for operating a network in which at least a first and also further network management messages are sent between a first and at least one second load and also a monitoring unit. The monitoring unit uses received network messages to associate the first network management message with the first or second load. The first load is operated sometimes in a first action operating state and sometimes in a sleep operating state. The first load sends a network management message indicating the change of operating state when it changes from one to another operating state.

The invention claimed is:

1. A method for monitoring operation of an apparatus connected to a vehicle communication channel in a vehicle for failure of the apparatus, the method comprising:
   determining, by a monitoring apparatus, that the apparatus is in an operating state based on determining an interval of time between two messages output by the apparatus to the vehicle communication channel is shorter than or the same as a particular time period;

receiving, at the monitoring apparatus, a monitoring logoff message output by, the apparatus onto the vehicle communication channel;

determining, by the monitoring apparatus, that the apparatus is in an operating state in response to receipt of the monitoring logoff message as a most recently received message output by the apparatus onto the vehicle communication channel;

excluding, by the monitoring apparatus, the apparatus that output the monitoring logoff message from monitoring until the apparatus outputs a further message onto the vehicle communication channel to reduce a volume of communication on the vehicle communication channel; and determining, by the monitoring apparatus, that the apparatus is in a failed state in response to the message most recently output by the apparatus not comprising the monitoring logoff message and more time than the particular time period having elapsed since the output of the message most recently output by the apparatus onto the vehicle communication channel, wherein the determination of the state of the apparatus is based on the message most recently output by the apparatus onto the vehicle communication channel and also absence of messages received from the apparatus via the vehicle communication channel during the particular time period.

2. The method of claim 1, wherein the particular time period has a value in the range from 20 ms to 2 s.

3. The method of claim 1, wherein the interval of time between two messages output by the apparatus is shorter than the particular time period.

4. The method of claim 1, further comprising transferring the apparatus to a sleep mode subsequently to the step of output of a monitoring logoff message by the apparatus onto the communication channel.

5. The method of claim 1, wherein the communication channel comprises a vehicle data bus.

6. The method of claim 1, wherein the determination of the failed state of the apparatus is based in part on detection of the monitoring log off message as the last message from the apparatus to the communication channel.

7. The vehicle of claim 1, wherein determination of the failed state of the apparatus is based in part on detection of the monitoring log off message as the last message from the apparatus to the communication channel.

8. An apparatus for a vehicle, the apparatus comprising:
an interface for connecting the apparatus to a vehicle communication channel of the vehicle for monitoring for failure of the apparatus; and
a processing unit that outputs a monitoring logoff message onto the vehicle communication channel via the interface to indicate that the apparatus is subsequently intended to be excluded from monitoring until the apparatus outputs a further message onto the vehicle communication channel to reduce a volume of communication on the vehicle communication channel,
wherein the processing unit is further configured to determine that the apparatus is in an operating state based on a determination that an interval of time between two messages output by the apparatus to the vehicle communication channel is shorter than or the same as a particular period,
wherein there is a determination that the apparatus is in a failed state in response to the message most recently output by the apparatus not comprising the monitoring logoff message and more time than the particular time period having elapsed since the output of the message most recently output by the apparatus onto the vehicle communication channel, and wherein the determination of the state of the apparatus is based on the message most recently output by the apparatus onto the vehicle communication channel and also absence of messages received from the apparatus via the vehicle communication channel during the particular time period.

9. The apparatus of claim 8, wherein the apparatus comprises a comfort controller of the vehicle.

10. The apparatus of claim 8 further comprising a sleep mode, wherein the apparatus is transferred to the sleep mode following output of the monitoring logoff message by the processing unit.

11. The apparatus of claim 8, wherein the determination of the failed state of the apparatus is based in part on detection of the monitoring log off message as the last message from the apparatus to the communication channel.

12. A monitoring apparatus for monitoring for failure of an apparatus connected to a vehicle communication channel in a vehicle, the monitoring apparatus comprising:
an interface for connecting the monitoring apparatus to the communication channel; and
a processing unit which determines that the apparatus is in an operating state based on a determination that an interval of time between two messages output by the apparatus to the vehicle communication channel is shorter than or the same as a particular time period, and that the apparatus is in an operating state when a message most recently output by the apparatus comprises a monitoring logoff message,
wherein the processing unit excludes the apparatus that has output the monitoring logoff message from the monitoring until the apparatus outputs a further message onto the communication channel to reduce a volume of communication on the vehicle communication channel,
wherein there is a determination that the apparatus is in a failed state in response to the message most recently output by the apparatus not comprising the monitoring logoff message and more time than the particular period having elapsed since the output of the message most recently output by the apparatus onto the vehicle communication channel, and
wherein the determination of the state of the apparatus is based on the message most recently output by the apparatus onto the vehicle communication channel and also absence of messages received from the apparatus via the vehicle communication channel during the particular time period.

13. The monitoring apparatus of claim 12, wherein the processing unit determines that the apparatus is in a failed state when the message most recently output by the apparatus does not comprise the monitoring logoff message and more time than the particular period has elapsed since the output of the message most recently output by the apparatus.

14. The monitoring apparatus of claim 12, wherein determination of the failed state of the apparatus is based in part on detection of the monitoring log off message as the last message from the apparatus to the communication channel.

15. A vehicle, comprising:
a vehicle communication channel for connecting apparatuses in the vehicle;
at least one apparatus comprising:
a first interface for connecting the apparatus to the vehicle communication channel of the vehicle; and a first processing unit that outputs a monitoring logoff message onto the vehicle communication channel via the first interface to indicate that the apparatus is subsequently intended to be excluded from monitoring until the apparatus outputs a further message onto the vehicle communication channel to reduce a volume of communication on the vehicle communication channel; and a monitoring apparatus for monitoring the at least one apparatus connected to the vehicle communication channel in the vehicle for failure of the at least one apparatus, the monitoring apparatus comprising:

a second interface for connecting the monitoring apparatus to the vehicle communication channel; and a second processing unit which determines that the at least one apparatus is in an operating state based on a determination that an interval of time between two messages output by the at least one apparatus to the vehicle communication channel is shorter than or the same as a particular time period, and that the at least one apparatus is in the operating state when a message most recently output by the apparatus comprises a monitoring logoff message, wherein there is a determination that the apparatus is in a failed state in response to the message most recently output by the apparatus not comprising the monitoring logoff message and more time than the particular time period having elapsed since the output of the message most recently output by the apparatus onto the vehicle communication channel, and wherein the determination of the state of the apparatus is based on the message most recently output by the apparatus onto the vehicle communication channel and also absence of messages received from the apparatus via the vehicle communication channel during the particular time period.

\* \* \* \* \*